United States Patent [19]
Dillon, Jr. et al.

[11] Patent Number: 6,149,229
[45] Date of Patent: *Nov. 21, 2000

[54] VEHICLE SEAT STORAGE DEVICE

[75] Inventors: James L. Dillon, Jr., Grand Prairie; John S. Buchan, Cedar Hill; Wyman C. Pierce, Dallas, all of Tex.

[73] Assignee: @Track Communications, Inc., Richardson, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/096,196

[22] Filed: Jun. 11, 1998

[51] Int. Cl.⁷ ...................................................... A47C 7/62
[52] U.S. Cl. ................................... 297/188.2; 297/DIG. 6
[58] Field of Search ........................ 297/DIG. 6, 188.01, 297/188.2, 188.06, 188.18, 228.13; 224/275; 248/317, 311.2, 309.1

[56] References Cited

U.S. PATENT DOCUMENTS

| | | |
|---|---|---|
| 2,061,302 | 11/1936 | Egler . |
| 2,163,759 | 6/1939 | McCann . |
| 3,042,467 | 7/1962 | Germick . |
| 3,913,810 | 10/1975 | Shaw ................................ 224/42.45 B |
| 3,986,649 | 10/1976 | Heimstra . |
| 4,339,061 | 7/1982 | Dunn . |
| 4,359,004 | 11/1982 | Chappell .................................. 108/44 |
| 4,588,229 | 5/1986 | Jay . |
| 4,728,147 | 3/1988 | Dutton . |
| 4,813,751 | 3/1989 | Fenn ..................................... 312/235 A |
| 4,913,393 | 4/1990 | Wood . |
| 5,199,678 | 4/1993 | Luebke . |
| 5,358,307 | 10/1994 | Shafer et al. ........................... 297/188 |
| 5,518,291 | 5/1996 | Shaide ................................ 297/215.12 |
| 5,573,288 | 11/1996 | Raffensperger .................... 297/188.12 |
| 5,678,888 | 10/1997 | Sowell et al. . |

Primary Examiner—Milton Nelson, Jr.
Attorney, Agent, or Firm—Baker Botts L.L.P.

[57] ABSTRACT

A storage device for attaching to a vehicle seat includes a storage member, a connecting member that removably couples to the frame of a vehicle seat, and an intermediate member that removably couples to the connecting member and the storage member.

40 Claims, 2 Drawing Sheets

VEHICLE SEAT STORAGE DEVICE

TECHNICAL FIELD OF THE INVENTION

This invention relates in general to storage devices, and more particularly to a vehicle seat storage device.

BACKGROUND OF THE INVENTION

Mobile voice communications equipment has enjoyed substantial use over the past decade. Many cars, trucks, airplanes, boats, and other vehicles are equipped with telecommunications equipment, such as cellular telephones, that facilitate mobile voice communications. Many cellular telephones today are directly mounted to a portion of the vehicle, such as the console, the seat, the armrest, or the ceiling of the cabin. Directly mounting telecommunications equipment to a portion of the vehicle permanently alters the vehicle, requires mounting hardware, and is often difficult to remove. Furthermore, the location of a cellular telephone mounted directly to the vehicle may not be customized for each operator of the vehicle. Therefore, operators may be required to divert their attention away from operating the vehicle to access the telecommunications equipment.

SUMMARY OF THE INVENTION

In accordance with the present invention, a vehicle seat storage device is provided which substantially eliminates or reduces disadvantages and problems associated with previous vehicle seat storage devices.

According to one embodiment of the present invention, a storage device for attaching to a vehicle seat includes a storage member, an intermediate member having a first end and a second end, and a connecting member. The intermediate member removably couples to the storage member at the first end, and the connecting member removably couples to a vehicle seat and the intermediate member.

Another embodiment of the present invention is a method for attaching a storage device to a vehicle seat. The method includes removably coupling a connecting member to a vehicle seat, removably coupling an intermediate member to the connecting member, and removably coupling a storage member to the intermediate member.

Technical advantages of the present invention include a storage device that is dynamically attachable to and detachable from a vehicle seat. The storage device attaches to the structure of various vehicle seats without permanent vehicle alteration or the use of mounting brackets or adhesive. The storage device includes a storage member, an intermediate member, and a connecting member that attach and detach one from the other using removable fasteners and adapt to operate with various seat configurations and height geometries. For example, an operator may customize the position of the storage device while operating the vehicle by repositioning the storage member and/or the intermediate member so that the stored telecommunications equipment is positioned within easy reach of the operator. As a result, the operator of the vehicle may remove or adjust the storage device without physically altering the vehicle or substantially diverting attention away from operating the vehicle.

BRIEF DESCRIPTION OF THE DRAWINGS

For a more complete understanding of the present invention and its advantages, reference is now made to the following description taken in conjunction with the accompanying drawings in which like reference numbers indicate like features and wherein.

DETAILED DESCRIPTION OF THE INVENTION

Figure 1:
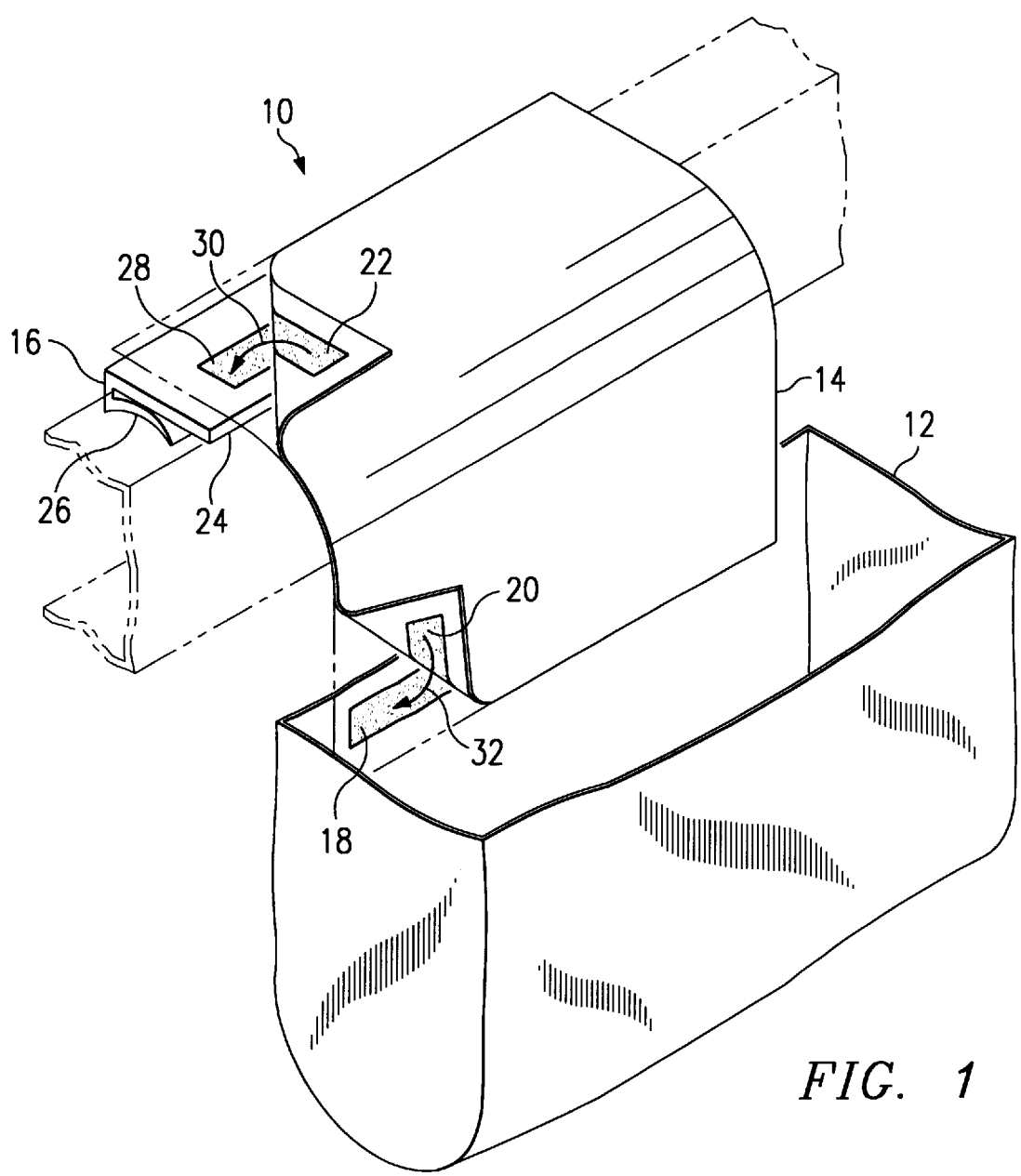
FIG. 1 illustrates a perspective view of a storage device for attaching to a vehicle seat.

FIG. 1 illustrates a storage device 10 that includes a storage member 12, an intermediate member 14, and a connecting member 16. In general, storage member 12 stores a variety of articles, such as telecommunications equipment, and removably attaches to intermediate member 14. Connecting member 16 removably attaches to the structure of a vehicle seat and to intermediate member 14. Therefore, an operator of a vehicle may remove or reposition storage member 12 or intermediate member 14 without detaching connecting member 16 from the vehicle seat by repositioning storage member 12 in relation to intermediate member 14 or by repositioning intermediate member 14 in relation to connecting member 16.

Storage member 12 comprises a bag, a pouch, or any other suitable member capable of storing various articles, such as, for example, telecommunications equipment. Storage member 12 may be constructed from canvas, denim, cotton, or any other suitable fabric or material. Storage member 12 includes a set of storage member fasteners 18 for removably attaching to intermediate member 14. Storage member fasteners 18 are affixed to storage member 12 at a suitably accessible position, such as, for example, along an inner edge of storage member 12. In one embodiment, storage member 12 includes additional fasteners (not shown) affixed to storage member 12 to fasten to telecommunications equipment, or other components stored within storage member 12.

Intermediate member 14 comprises a band of canvas, denim, cotton, or any other suitable fabric or material that includes a first set of intermediate member fasteners 20 affixed at a first end of member 14 and a second set of intermediate member fasteners 22 affixed at a second end of member 14. The first set of intermediate member fasteners 20 removably attaches to storage member fasteners 18 to attach intermediate member 14 removably to storage member 12.

Connecting member 16 comprises a clamp, a brace, a clasp, or any other suitable member capable of removably attaching to the structure of a vehicle seat, such as, for example, the frame of the vehicle seat. In one embodiment, connecting member 16 comprises a clip having a base 24 and a hook 26 coupled to and biased toward base 24 to attach removably to the frame of a vehicle seat. Connecting member 16 may be constructed from plastic, rubber, steel, or any other suitable material or composition of materials. Connecting member 16 includes a set of connecting member fasteners 28 that removably attach to the second set of intermediate member fasteners 22 to attach connecting member 16 removably to intermediate member 14.

Fasteners 18, 20, 22, and 28 comprise hook and loop fasteners, snap fasteners, zippers, or any other suitable type of fastener capable of removably attaching members 12, 14, and 16 to each other. Fasteners 18, 20, 22, and 28 may be sized to support varying shear loads. For example, hook and loop fasteners fastened along a large surface area may support larger shear loads than hook and loop fasteners fastened along a small surface area. By establishing the surface area of hook and loop fasteners 18, 20, 22, and 28, the shear load capacity of storage device 10 may be determined.

In operation, connecting member 16 removably attaches to the structure of a vehicle seat, such as the frame, and fasteners 22 and 28 removably attach intermediate member 14 to connecting member 16 along arrow 30. Fasteners 20 and 18 removably attach intermediate member 14 to storage member 12 along arrow 32. By removably attaching storage device 12 to intermediate member 14 and intermediate member 14 to connecting member 16, the operator of the vehicle may remove or reposition storage member 12, intermediate member 14, or both without detaching connecting member 16 from the vehicle seat. This allows the operator of the vehicle to adjust the position of storage device 10 without modifying the vehicle or diverting attention away from operating the vehicle.

For example, the operator of the vehicle need not stop the vehicle, pull the vehicle over to the side of the road, and adjust connecting member 16 about the structure of the vehicle seat in order to remove or reposition storage device 10. Instead, the operator may detach storage member 12 from intermediate member 14 by disengaging fasteners 18 and 20, reposition storage member 14, and reattach storage member 12 to intermediate member 14 by reengaging fasteners 18 and 20 while still operating the vehicle. This allows the operator to customize the position of storage member 12 and the stored articles, such as cellular telephones or other telecommunications equipment, without diverting attention away from operating the vehicle. Similarly, the operator may detach, reposition, and reattach intermediate member 14 in relation to connecting member 16 by manipulating fasteners 22 and 28. In another example, the operator may safely remove storage member 12 from the vehicle seat to clear the aisle between the vehicle seat and the passenger seat of a vehicle in the case of an emergency.

Figure 2:
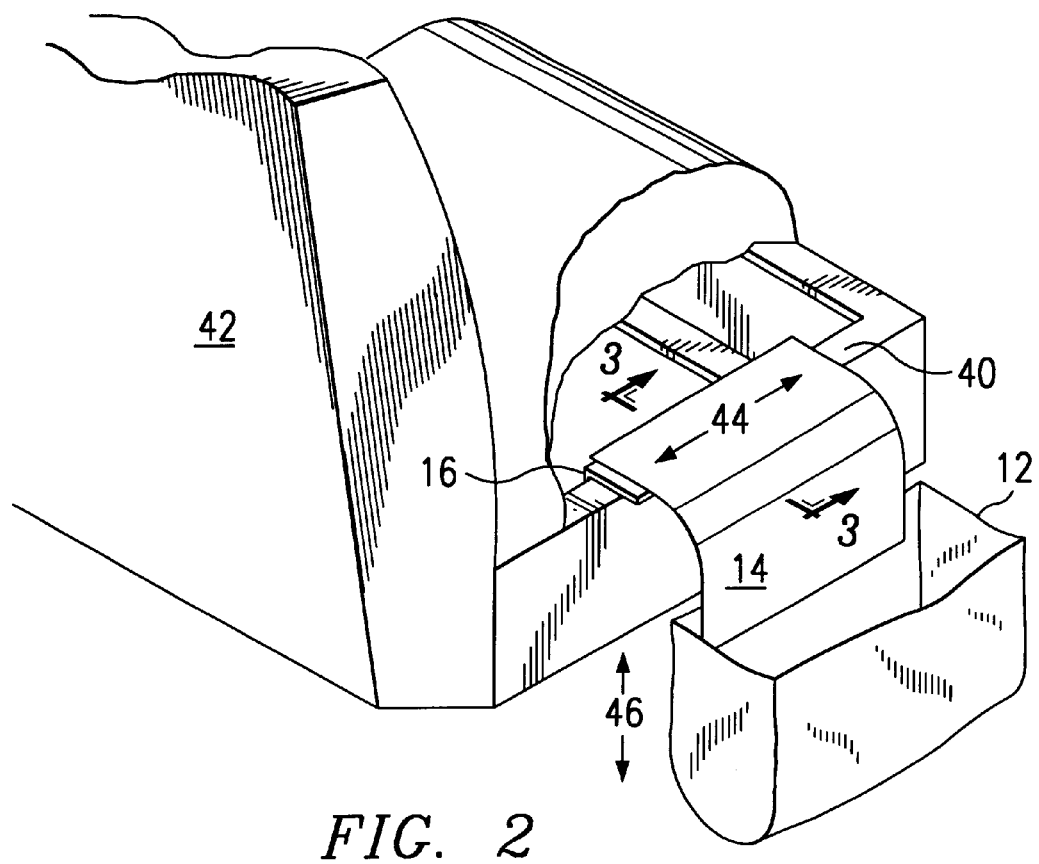
FIG. 2 illustrates the storage device attached to the frame of a vehicle seat.

FIG. 2 illustrates storage device 10 attached to a frame 40 of a vehicle seat 42 by connecting member 16. Intermediate member 14 and connecting member 16 removably attach storage member 12 to various vehicle seat frames 40 without permanent vehicle alteration or the use of mounting brackets or adhesives. Furthermore, storage device 10 adjusts to operate with different seat configurations and height geometries. For example, storage device 10 may attach to frame 40 at various locations along line 44 and storage member 12 may attach to intermediate member 14 at various locations along line 46. This allows an operator of the vehicle sitting in seat 42 to customize the position of storage device 10 in relation to seat 42 so that the operator may access articles stored in storage member 12 without substantially diverting attention away from operating the vehicle.

Figure 3:
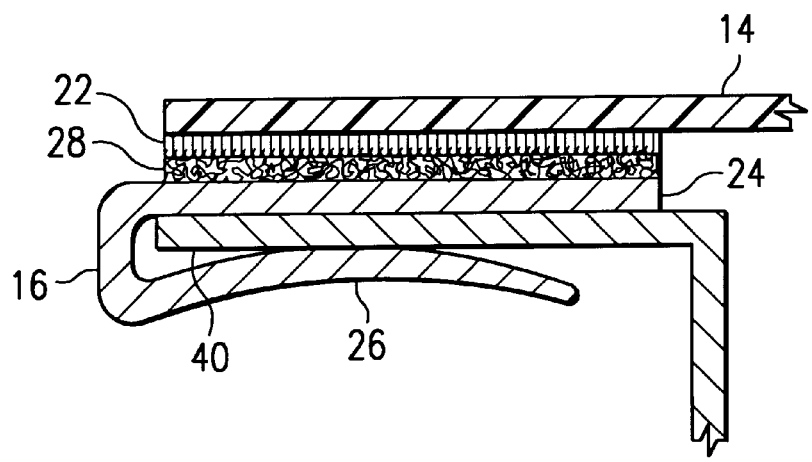
FIG. 3 illustrates, in more detail, a cross-sectional view taken along line 3—3 of FIG. 2 depicting a connecting member of the storage device attached to the frame of a vehicle seat.

FIG. 3 illustrates, in more detail, a cross-sectional view taken along line 3—3 of FIG. 2 depicting connecting member 16 attached to frame 40. By inserting vehicle frame 40 into connecting member 16, as illustrated, hook 26, biased toward base 24, imparts sufficient force upon seat frame 40 to secure it within connecting member 16. Fasteners 22 and 28 secure intermediate member 14 to connecting member 16 when storage device 10 is in use, but may also detach intermediate member 14 from connecting member 16. This allows an operator of the vehicle to remove or readjust members 12 and/or 14 without detaching connecting member 16 from frame 40 of vehicle seat 42. It should be understood that although FIG. 3 illustrates connecting member 16 attached to a flat shaped vehicle seat frame 40, connecting member 16 adapts to attach to a tubular shaped frame 40, an angled frame 40, or any other shaped structure of vehicle seat 42.

Although the present invention has been described with several embodiments, a myriad of changes, variations, alterations, transformations, and modifications may be suggested to one skilled in the art, and it is intended that the present invention encompass such changes, variations, alterations, transformations and modifications as fall within the spirit and scope of the appended claims.

What is claimed is:

1. A storage device for attaching to a vehicle seat, the storage device comprising:
   a storage member having a storage member fastener;
   an intermediate member having a first end and a second end, the first end having a first intermediate member fastener operable to couple removably to the storage member fastener, the second end having a second intermediate member fastener; and
   a connecting member having a connecting member fastener operable to couple removably to the second intermediate member fastener, the connecting member configured to removably attach to a vehicle seat independent of the intermediate member.

2. The storage device of claim 1, wherein the storage member can be repositioned without detaching the connecting member from the vehicle seat.

3. The storage device of claim 1, wherein each fastener comprises one part of a hook and loop fastener.

4. The storage device of claim 1, wherein each fastener comprises a snap fastener.

5. The storage device of claim 1, wherein the connecting member comprises a clip having a base and a hook coupled to the base and biased toward the base, wherein the bias of the hook towards the base generates a force that removably attaches the connecting member to the vehicle seat when a portion of the vehicle seat is inserted between the base and the hook.

6. The storage device of claim 5, wherein the hook is integrally formed with the base.

7. The storage device of claim 1, wherein the storage member has a fastener operable to couple removably to a stored component.

8. The storage device of claim 1, wherein the connecting member is configured to removably attach to a frame of the vehicle seat.

9. A method for attaching a storage device to a vehicle seat, the method comprising:
   removably attaching a connecting member to a vehicle seat;
   removably coupling an intermediate member to the connecting member; and
   removably coupling a storage member to the intermediate member;
   wherein the connecting member comprises a clip having a base and a hook coupled to the base and biased toward the base, the bias of the hook towards the base generating a force that removably attaches the connecting member to the vehicle seat when a portion of the vehicle seat is inserted between the base and the hook, such that the connecting member is removably attached to the vehicle seat independent of the intermediate member.

10. The method of claim 9, wherein:
   the connecting member has a connecting member fastener;

the intermediate member has a first intermediate member fastener at a first end and a second intermediate member fastener at a second end; and the storage member has a storage member fastener.

11. The method of claim 10, wherein the step of removably coupling the intermediate member to the connecting member comprises removably coupling the first intermediate member fastener to the connecting member fastener.

12. The method of claim 10, wherein the step of removably coupling the storage member to the intermediate member comprises removably coupling the storage member fastener to the second intermediate member fastener.

13. The method of claim 10, wherein each fastener comprises a snap fastener.

14. The method of claim 10, wherein each fastener comprises one part of a hook and loop fastener.

15. The method of claim 9, wherein the step of removably attaching the connecting member comprises removably attaching the connecting member to a frame of the vehicle seat.

16. The method of claim 9, further comprising repositioning the storage member without detaching the connecting member from the vehicle seat.

17. The method of claim 9, wherein the storage member further comprises a fastener operable to couple removably to a stored component.

18. A storage device for attaching to a frame of a vehicle seat, the storage device comprising:
   a storage member having a storage member fastener;
   an intermediate member having a first end and a second end, the intermediate member having a first intermediate member fastener at the first end and a second intermediate member fastener at the second end, wherein the first intermediate member fastener is operable to couple removably to the storage member fastener; and
   a clip member comprising a base coupled to a clip member fastener operable to couple removably to the second intermediate member fastener, the clip member further comprising a hook coupled to the base and biased toward the base, wherein the bias of the hook towards the base generates a force that removably attaches the connecting member to the vehicle seat when a portion of the vehicle seat is inserted between the base and the hook, resulting in the clip member removably attaching to the seat independent of the intermediate member.

19. The storage device of claim 18, wherein each fastener comprises one part of a hook and loop fastener.

20. The storage device of claim 18, wherein each fastener comprises a snap fastener.

21. The storage device of claim 18, wherein the hook is integrally formed with the base.

22. The storage device of claim 18, wherein the storage member has a fastener operable to couple removably to a stored component.

23. The storage device of claim 18, wherein the storage member can be repositioned without detaching the clip member from the vehicle seat.

24. A storage device for attaching to a vehicle seat, the storage device comprising:
   a storage member having a storage member fastener;
   an intermediate member having a first end and a second end, the first end having a first intermediate member fastener operable to couple removably to the storage member fastener, the second end having a second intermediate member fastener; and
   a connecting member having a connecting member fastener operable to couple removably to the second intermediate member fastener, the connecting member configured to removably attach to a vehicle seat independent of the intermediate member;
   wherein each fastener comprises one part of a hook and loop fastener.

25. The storage device of claim 24, wherein the storage member has a fastener operable to couple removably to a stored component.

26. The storage device of claim 24, wherein the connecting member is configured to removably attach to a frame of the vehicle seat.

27. The storage device of claim 24, wherein the connecting member comprises a clip having a base and a hook coupled to the base and biased toward the base, the bias of the hook towards the base generating a force that removably attaches the connecting member to the vehicle seat when a portion of the vehicle seat is inserted between the base and the hook.

28. The storage device of claim 27, wherein the hook is integrally formed with the base.

29. A storage device for attaching to a vehicle seat, the storage device comprising:
   a storage member having a storage member fastener;
   an intermediate member having a first end and a second end, the first end having a first intermediate member fastener operable to couple removably to the storage member fastener, the second end having a second intermediate member fastener; and
   a connecting member having a connecting member fastener operable to couple removably to the second intermediate member fastener, the connecting member configured to removably attach to a vehicle seat independent of the intermediate member;
   wherein each fastener comprises a snap fastener.

30. The storage device of claim 29, wherein the storage member has a fastener operable to couple removably to a stored component.

31. The storage device of claim 29, wherein the connecting member is configured to removably attach to a frame of the vehicle seat.

32. The storage device of claim 29, wherein the connecting member comprises a clip having a base and a hook coupled to the base and biased toward the base, the bias of the hook towards the base generating a force that removably attaches the connecting member to the vehicle seat when a portion of the vehicle seat is inserted between the base and the hook.

33. The storage device of claim 32, wherein the hook is integrally formed with the base.

34. A storage device for attaching to a vehicle seat, the storage device comprising:
   a storage member;
   an intermediate member having a first end and a second end, the intermediate member removably coupled to the storage member at the first end; and
   a connecting member removably coupled to the intermediate member, the connecting member configured to removably attach to a vehicle seat independent of the intermediate member, wherein the connecting member comprises a clip having a base and a hook coupled to the base and biased toward the base, the bias of the hook towards the base generating a force that removably attaches the connecting member to the vehicle seat when a portion of the vehicle seat is inserted between the base and the hook.

35. The storage device of claim 34, wherein the storage member has a fastener operable to couple removably to a stored component.

36. The storage device of claim 34, wherein the connecting member is configured to removably attach to a frame of the vehicle seat.

37. The storage device of claim 34, wherein:

the storage member has a storage member fastener;

the intermediate member has a first intermediate member fastener at the first end operable to couple removably to the storage member fastener and a second intermediate member fastener at the second end; and the connecting member has a connecting member fastener operable to couple removably to the second intermediate member fastener.

38. The storage device of claim 37, wherein each fastener comprises one part of a hook and loop fastener.

39. The storage device of claim 37, wherein each fastener comprises a snap fastener.

40. The storage device of claim 34, wherein the hook is integrally formed with the base.

* * * * *